(12) United States Patent (10) Patent No.: US 12,076,698 B2
Ferguson, Jr. (45) Date of Patent: Sep. 3, 2024

(54) APPARATUS AND METHOD FOR HOMOGENIZING A FOOD PRODUCT

(71) Applicant: Edward Wayman Ferguson, Jr., University City, MO (US)

(72) Inventor: Edward Wayman Ferguson, Jr., University City, MO (US)

(73) Assignee: Edward Wayman Ferguson, Jr., University City, MO (US)

( * ) Notice: Subject to any disclaimer, the term of this patent is extended or adjusted under 35 U.S.C. 154(b) by 0 days.

(21) Appl. No.: 18/168,376

(22) Filed: Feb. 13, 2023

(65) Prior Publication Data

US 2023/0191345 A1    Jun. 22, 2023

Related U.S. Application Data

(63) Continuation of application No. 16/946,251, filed on Jun. 12, 2020, now Pat. No. 11,577,207.

(Continued)

(51) Int. Cl.

| | | |
|---|---|---|
| *B01F 9/00* | (2006.01) |
| *A47J 43/046* | (2006.01) |
| *A47J 43/08* | (2006.01) |
| *B01F 11/00* | (2006.01) |
| *B01F 15/00* | (2006.01) |
| *B01F 15/06* | (2006.01) |
| *B01F 29/31* | (2022.01) |
| *B01F 31/50* | (2022.01) |
| *B01F 35/221* | (2022.01) |
| *B01F 35/32* | (2022.01) |
| *B01F 35/92* | (2022.01) |
| *B01F 29/00* | (2022.01) |
| *B01F 35/90* | (2022.01) |
| *B01F 101/06* | (2022.01) |

(52) U.S. Cl.
CPC ............ *B01F 29/31* (2022.01); *A47J 43/046* (2013.01); *A47J 43/085* (2013.01); *B01F 31/50* (2022.01); *B01F 35/22161* (2022.01); *B01F 35/32025* (2022.01); *B01F 35/3204* (2022.01); *B01F 35/92* (2022.01); *B01F 29/4031* (2022.01); *B01F 2035/98* (2022.01); *B01F 2101/06* (2022.01)

(58) Field of Classification Search
CPC ...... B01F 29/31; B01F 2101/10; B01F 29/64; A47J 43/04; A47J 43/24; C12M 27/12
USPC .................................. 426/406; 366/200, 213
See application file for complete search history.

(56) References Cited

U.S. PATENT DOCUMENTS 3,744,592 A   7/1973 Neuman
4,254,835 A   3/1981 Lichtgarn
(Continued)

*Primary Examiner* — Elizabeth Insler
(74) *Attorney, Agent, or Firm* — Armstrong Teasdale LLP

(57) ABSTRACT

A mixing apparatus includes a housing that includes a first end wall, a second end wall, and a top wall that at least partially define a cavity of the housing. The apparatus also includes a pair of rollers extending from the first end wall to the second end wall and coupled to the housing such that each roller is rotatable relative to the housing. The apparatus also includes a motor positioned in the cavity and enclosed within the housing, the motor operatively coupled to a first roller of the pair of rollers and configured to drive the first roller to rotate for rotating the container. The motor is operatively coupleable to a power source to drive the first roller of the pair of rollers.

19 Claims, 6 Drawing Sheets

Related U.S. Application Data

(60) Provisional application No. 62/860,449, filed on Jun. 12, 2019.

(56) References Cited

U.S. PATENT DOCUMENTS

| | | | | |
|---|---|---|---|---|
| 4,669,274 | A * | 6/1987 | Huang | A23G 9/103 366/233 |
| 4,785,727 | A * | 11/1988 | Miyata | A23B 7/10 366/233 |
| 7,229,204 | B2 * | 6/2007 | Haskell | B01F 29/63 366/233 |
| 7,553,064 | B2 * | 6/2009 | Johnson | B01F 31/201 366/218 |
| 2009/0279379 | A1 | 11/2009 | Gurney | |
| 2014/0036615 | A1 * | 2/2014 | Okuda | B01F 31/25 366/114 |

* cited by examiner

APPARATUS AND METHOD FOR HOMOGENIZING A FOOD PRODUCT

CROSS-REFERENCE TO RELATED APPLICATIONS

This application is a continuation application of U.S. patent application Ser. No. 16/946,251, filed Jun. 12, 2020, which claims the benefit of priority to U.S. Provisional Patent Application No. 62/860,449, filed Jun. 12, 2019, the entire contents and disclosure of each of which are hereby incorporated by reference.

BACKGROUND

This disclosure is directed to a mixing apparatus, and more specifically to a mixing apparatus for homogenizing food products.

At least some food products are non-homogenized or unmixed, or have a tendency to separate out or become non-homogenized over time. Some of these food products are naturally prone to separating, such as oil-based foods from which the oil naturally separates, such as peanut butter, or suspensions that naturally settle over time if left undisturbed, such as salad dressings. Mixing or homogenizing these food products can be time-consuming and messy. In addition, some food products will de-homogenize if left at room temperature.

Accordingly, a need exists for an apparatus capable of mixing non-homogenized food products without opening the food container. Additionally, a need exists for an apparatus capable of homogenizing a food product in a cool location, such as a refrigerator, to avoid separation of the food product after it is mixed.

BRIEF DESCRIPTION OF THE DISCLOSURE

In one aspect, a mixing apparatus for mixing a non-homogenized food product contained within a container is provided. The mixing apparatus includes a housing including a first end wall, a second end wall, and a top wall extending between the first end wall and the second end wall. The first end wall, the second end wall, and the top wall at least partially define a cavity of the housing, and the top wall slopes downwardly from the second wall towards the first end wall, the first end wall partially defining a projection. The mixing apparatus also includes a pair of rollers extending from the first end wall to the second end wall and coupled to the housing such that each roller of the pair of rollers is rotatable relative to the housing about a respective axis, wherein the respective axes of the pair of rollers are oriented parallel to one another. The mixing apparatus further includes a motor positioned in the cavity and enclosed within the housing, the motor operatively coupled to a first roller of the pair of rollers and configured to drive the first roller to rotate for rotating the container. The motor is operatively coupleable to a power source to drive the first roller of the pair of rollers.

In another aspect, a system including a mixing apparatus for mixing a non-homogenized food product and a container including the non-homogenized food product is provided. The mixing apparatus includes a housing having a first end wall, a second end wall, and a top wall extending between the first end wall and the second end wall. The first end wall, the second end wall, and the top wall at least partially define a cavity of the housing, wherein the top wall slopes downwardly from the second wall towards the first end wall, the first end wall partially defining a projection. The mixing apparatus also includes a pair of rollers extending from the first end wall to the second end wall and coupled to the housing such that each roller of the pair of rollers is rotatable relative to the housing about a respective axis, wherein the respective axes of the pair of rollers are oriented parallel to one another. The mixing apparatus further includes a motor positioned in the cavity and enclosed within the housing, the motor operatively coupled to a first roller of the pair of rollers and configured to drive the first roller to rotate. The motor is operatively coupleable to a power source to drive the first roller of the pair of rollers. The container is positioned on the pair of rollers such that, when the first roller is driven by the motor to rotate, the container is rotated by the first roller to mix the non-homogenized food product.

In yet another aspect, a method of mixing a non-homogenized food product is provided. The method includes providing a container including the non-homogenized food product, and placing the container onto a mixing apparatus. The mixing apparatus includes (i) a housing defining a cavity enclosed therein, wherein the housing includes a first end wall, a second end wall, and a top wall extending between the first end wall and the second end wall, wherein the top wall slopes downwardly from the second wall towards the first end wall, the first end wall partially defining a projection, (ii) a pair of rollers coupled to the housing such that each roller of the pair of rollers is rotatable relative to the housing about a respective axis, wherein the respective axes of the pair of rollers are oriented parallel to one another, and (iii) a motor positioned in the cavity and operatively coupled to a first roller of the pair of rollers, the motor configured to drive the first roller to rotate, wherein the motor is operatively coupleable to a power source to drive the first roller of the pair of rollers. The method further includes activating the mixing apparatus such that the first roller is driven by the motor to rotate and cause the container to rotate to mix the non-homogenized food product.

In a further aspect, a mixing apparatus for mixing a non-homogenized food product contained within a container is provided. The mixing apparatus includes a housing including a first end wall, a second end wall, and a top wall extending between the first end wall and the second end wall. The first end wall, the second end wall, and the top wall at least partially define a cavity of the housing. The mixing apparatus also includes a pair of rollers extending from the first end wall to the second end wall and coupled to the housing such that each roller of the pair of rollers is rotatable relative to the housing about a respective axis. The respective axes of the pair of rollers are oriented parallel to one another. The mixing apparatus also includes a motor positioned in the cavity and enclosed within the housing, the motor operatively coupled to a first roller of the pair of rollers and configured to drive the first roller to rotate for rotating the container, and a battery positioned in the cavity and enclosed within the housing, the battery operatively coupled to the motor to provide power thereto to drive the first roller of the pair of rollers.

In another aspect, a system is provided, including a mixing apparatus for mixing a non-homogenized food product, and a container including the non-homogenized food product. The mixing apparatus includes a housing including a first end wall, a second end wall, and a top wall extending between the first end wall and the second end wall. The first end wall, the second end wall, and the top wall at least partially define a cavity of the housing. The mixing apparatus also includes a pair of rollers extending from the first end wall to the second end wall and coupled to the housing such that each roller of the pair of rollers is rotatable relative to the housing about a respective axis. The respective axes of the pair of rollers are oriented parallel to one another. The mixing apparatus also includes a motor positioned in the cavity and enclosed within the housing, the motor operatively coupled to a first roller of the pair of rollers and configured to drive the first roller to rotate, and a battery positioned in the cavity and enclosed within the housing, the battery operatively coupled to the motor to provide power thereto to drive the first roller of the pair of rollers. The container is positioned on the top wall of the mixing apparatus and in contact with the pair of rollers such that, when the first roller is driven by the motor to rotate, the container is rotated by the first roller to mix the non-homogenized food product.

In a further aspect, a method of mixing a non-homogenized food product is provided. The method includes providing a container including the non-homogenized food product, and placing the container onto a mixing apparatus. The mixing apparatus includes (i) a housing defining a cavity enclosed therein, (ii) a pair of rollers coupled to a top wall of the housing, (iii) a motor positioned in the cavity and operatively coupled to a first roller of the pair of rollers, the motor configured to drive the first roller to rotate, and (iv) a battery positioned in the cavity and enclosed within the housing, the battery configured operatively coupled to the motor and configured to provide power thereto to drive the first roller of a pair of rollers. The method also includes activating the mixing apparatus such that the first roller is driven by the motor to rotate and cause the container to rotate to mix the non-homogenized food product.

DETAILED DESCRIPTION OF THE DISCLOSURE

The present disclosure is directed to mixing apparatus configured to mix or homogenize food products contained within a container. Embodiments of the mixing apparatus described herein include a housing enclosing a motor and a power source, such as a battery. The power source provides power to the motor, which in turn rotates a roller coupled to the housing. The roller rotates the container to mix the food product therein. The housing fully encloses the motor and power source therein, which minimizes the overall size of the mixing apparatus. Moreover, the mixing apparatus is operable without an external power source, such that the mixing apparatus can be activated and placed in an enclosed space (e.g., a refrigerator) while operating.

Figure 1:
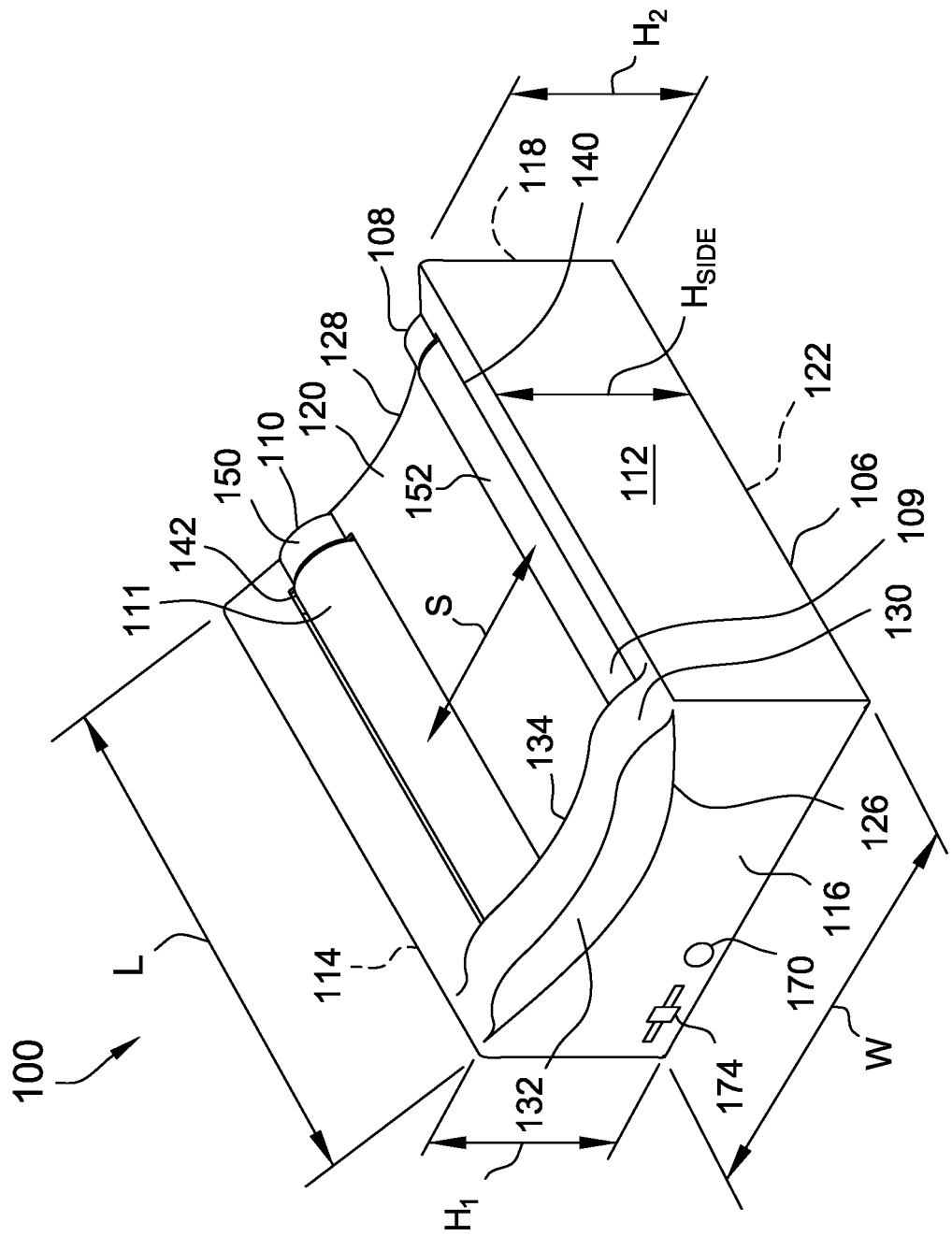
FIG. 1 is a perspective view of an example mixing apparatus.
Figure 2:
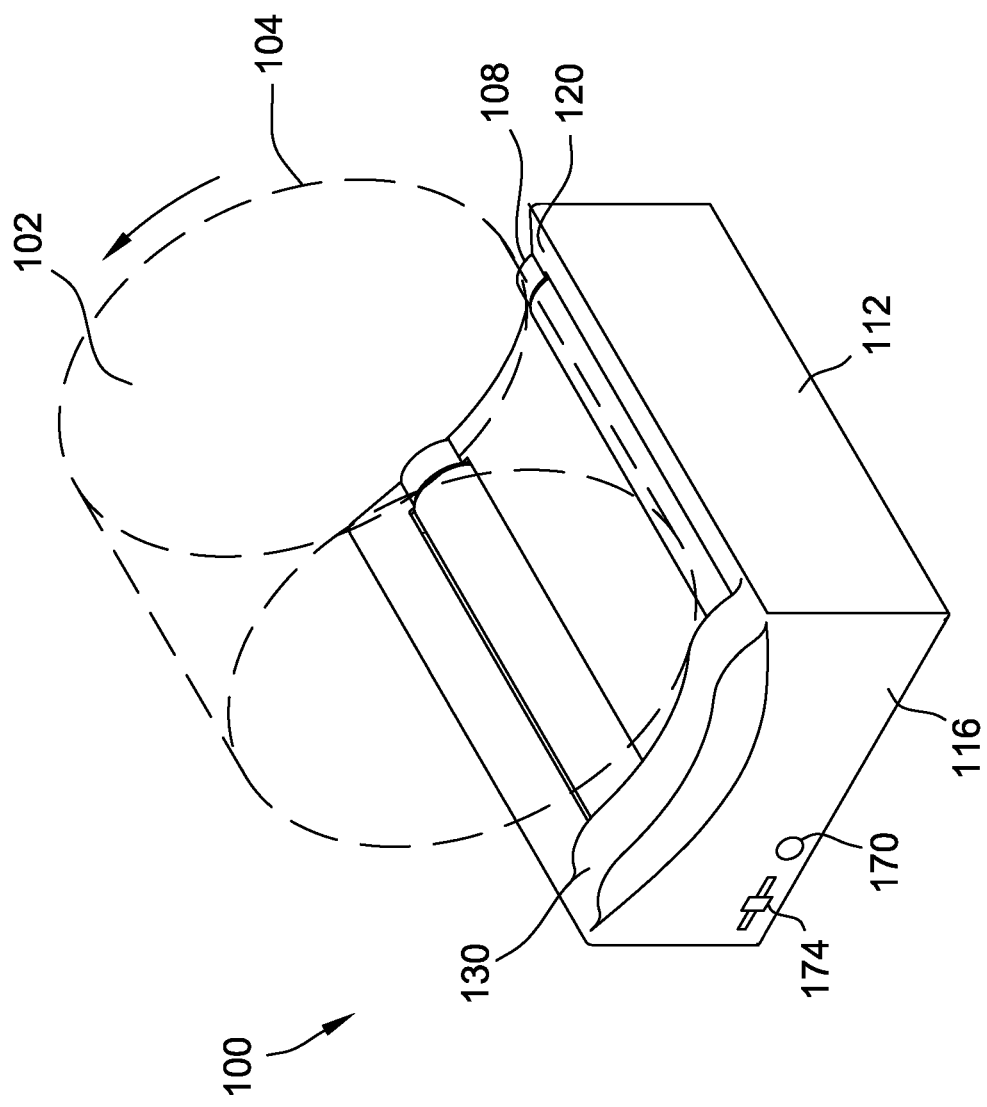
FIG. 2 is perspective view of the mixing apparatus shown in FIG. 1 including a container thereon.
Figure 3:
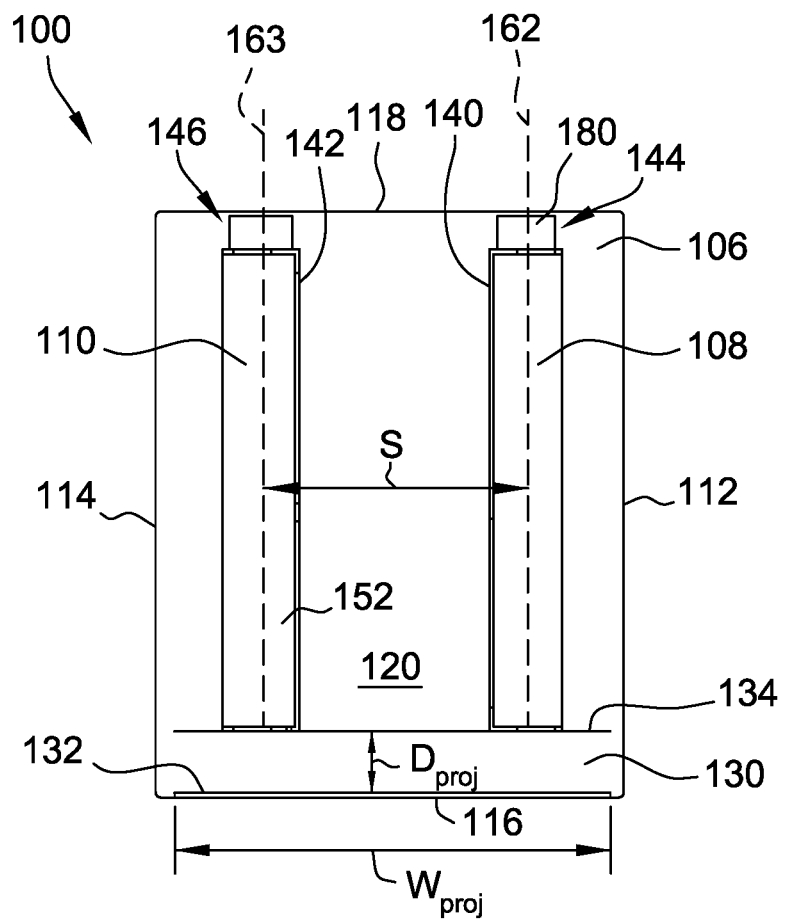
FIG. 3 is a top view of the mixing apparatus shown in FIG. 1.
Figure 4:
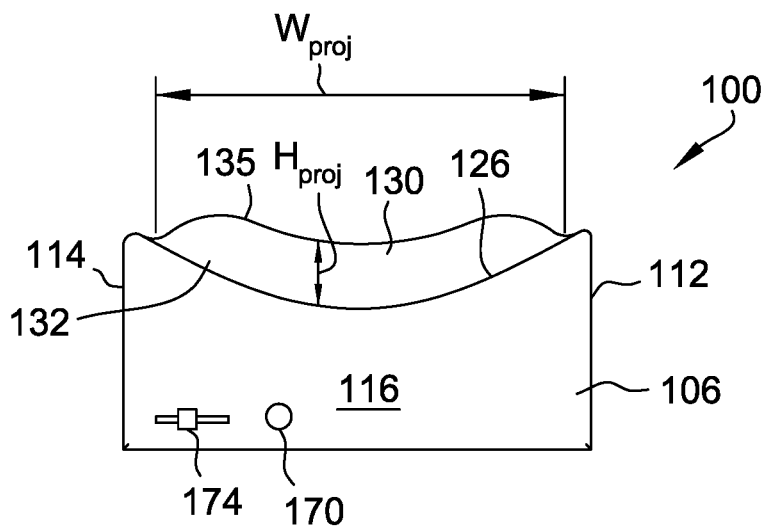
FIG. 4 is an end view of the mixing apparatus shown in FIG. 1.
Figure 5:
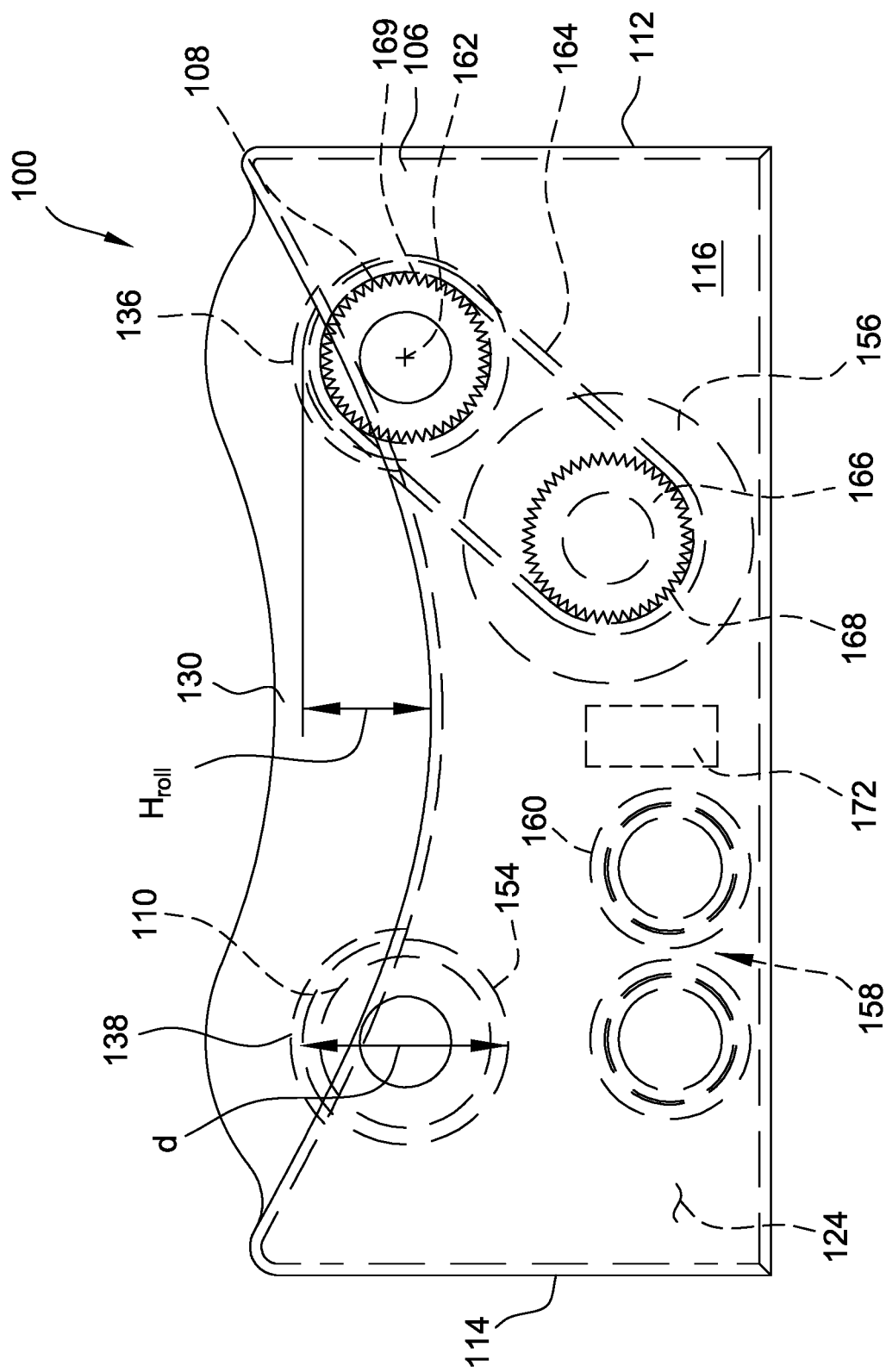
FIG. 5 is another end view of the mixing apparatus shown in FIG. 1, with internal components thereof shown in broken lines.
Figure 6:
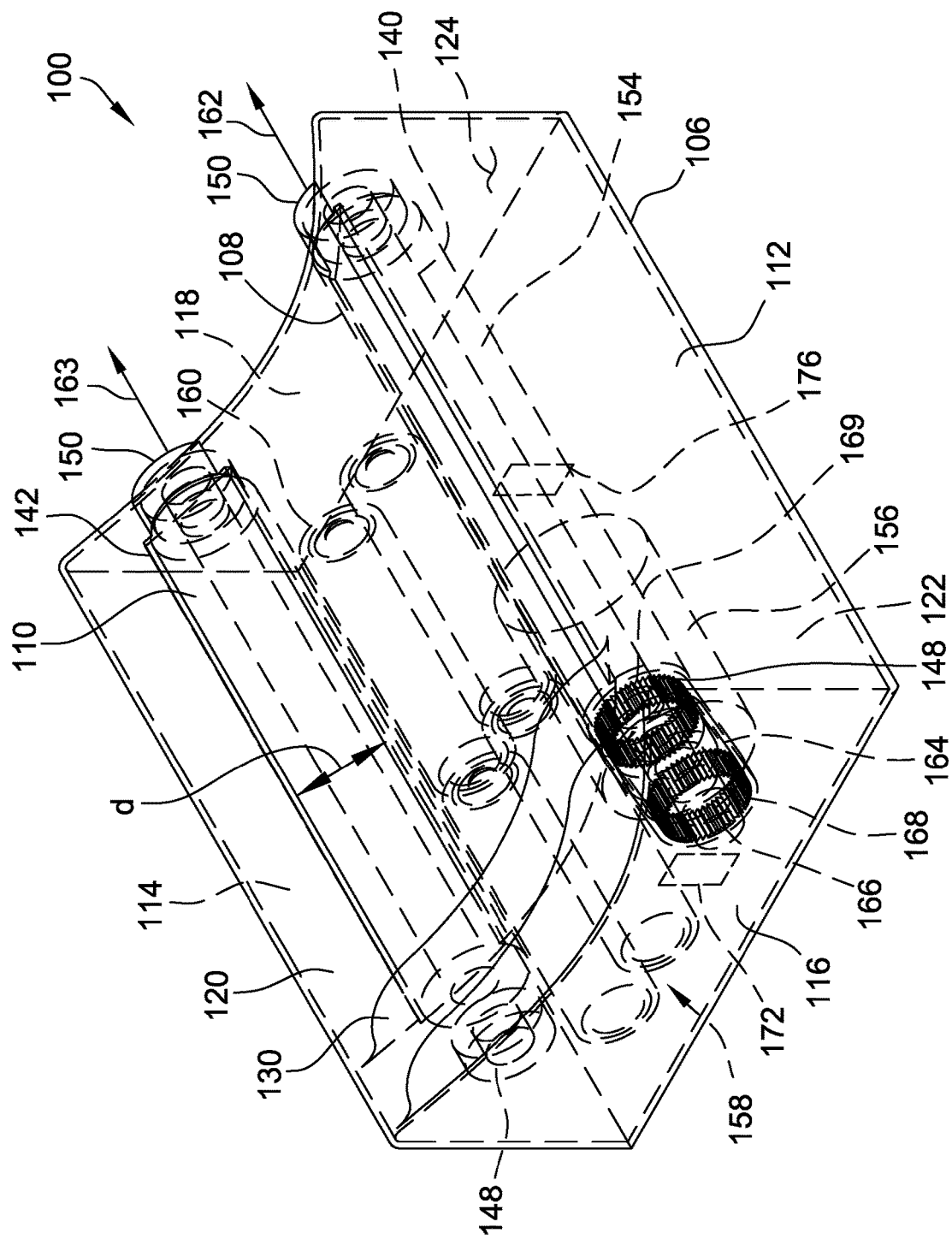
FIG. 6 is a perspective view of the mixing apparatus shown in FIG. 1, with internal components thereof shown in broken lines.

Turning now to the figures, FIGS. 1-6 illustrate an example embodiment of a mixing apparatus 100 according to the present disclosure. Specifically, FIG. 1 is a perspective view of the mixing apparatus 100, FIG. 2 illustrates the mixing apparatus 100 mixing food product 102 (e.g., a non-homogenized oil-based food product 102) in an example container 104, and FIGS. 3 and 4 are a top view and an end view, respectively, of the mixing apparatus 100. FIGS. 5 and 6 illustrate internal components of the mixing apparatus 100.

In the example embodiment, the mixing apparatus 100 includes a housing 106 and a pair of rollers 108, 110 coupled to the housing 106. In particular, the housing 106 has a first side wall 112, a second side wall 114 opposite the first side wall 112, a first end wall 116, a second end wall 118 opposite the first end wall 116, a top wall 120, and a bottom wall 122. The walls 112, 114, 116, 118, 120, 122 of the housing 106 define an internal cavity 124 therein (see FIGS. 5 and 6). As described further herein, a plurality of internal components are positioned within the cavity 124 and, as such, are enclosed within the housing 106. The housing 106 may be formed from any suitable material(s) that enable the mixing apparatus 100 to function as described herein. For example, the housing 106 may include plastic and/or metal material(s).

The first and second side walls 112, 114 are parallel to one another and are generally sized and shaped the same as one another. In the example embodiment, the first and second side walls 112, 114 are generally rectangular. The first and second side walls 112, 114 each define a length L of the housing 106, which may also be referred to as a length L of the mixing apparatus 100, as well as a side wall height $H_{side}$. In the example embodiment, the length L is between about 10 cm and about 20 cm, and may be about 14 cm. In addition, the side wall height $H_{side}$ is between about 3 cm and about 8 cm, and may be about 4 cm. Alternatively, the first and second side walls 112, 114 may have any other shape and/or may be sized and/or shaped differently from one another.

The first and second end walls 116, 118 extend between and perpendicular to the first and second side walls 112, 114. The first and second end walls 116, 118 are parallel to one another and generally sized and shaped the same as one another. In the example embodiment, the first and second end walls 116, 118 define a width W of the housing 106, which may also be referred to as a width W of the mixing apparatus 100. In the example embodiment, the width W is between about 7 cm and about 15 cm, and may be about 10 cm. Each of the first and second end walls 116, 118 has a respective top edge 126, 128 that, in the example embodiment, is arcuate. In an alternative embodiment, the first end wall 116 and/or the second end wall 118 may not have an arcuate top edge (e.g., may be generally rectangular).

The top wall 120 extends in the widthwise direction between the first and second side walls 112, 114 and extends in the lengthwise direction between the first and second end walls 116, 118. In the example embodiment, the top wall 120 adjoins the side walls 112, 114 and the end walls 116, 118. The top wall 120 is arcuate and defines the arcuate shape of the top edges 126, 128 of the first and second end walls 116, 118.

In operation, the container 104 including the food product 102 to be mixed is placed on the mixing apparatus 100. As described further herein, the container 104 is rotated by the mixing apparatus 100 to mix the food product 102 therein. The mixing apparatus 100 has the length L and width W to accommodate a variety of sizes of containers 104, including containers having varying diameters and varying lengths. Specifically, the arcuate top wall 120 enables the mixing apparatus 100 to accommodate containers 104 of varying diameters. Moreover, the second end wall 118 has the top edge 128 defined by the arcuate profile of the top wall 120, which enables containers 104 having a length greater than the length L of the mixing apparatus 100 to be mixed thereby. That is, the second end wall 118 having the arcuate top edge 128 will not inhibit use of containers 104 that extend beyond the second end wall 118 with mixing apparatus 100.

The top wall 120 includes a projection 130 extending upwardly therefrom (e.g., outwardly from the housing 106 parallel to a direction extending between the top wall 120 and the bottom wall 122). The projection 130 extends from the top wall 120 adjacent to the first end wall 116 of the housing 106 and has a width $W_{proj}$ (see FIGS. 3 and 4) that is approximately equal to or less than the width W of the housing 106. That is, the projection 130 terminates adjacent to the first side wall 112 on one end thereof, and terminates adjacent to the second side wall 114 on the opposing end thereof. The projection 130 has a height $H_{proj}$ and a depth $D_{proj}$ (see FIGS. 3 and 4), measured parallel to the lengthwise direction of the mixing apparatus 100 between end faces 132, 134 of the projection 130. In the example embodiment, a top edge 135 of the projection 130 (see FIG. 4) has a curvature complementary to a curvature of the top wall 120.

In one example embodiment, the first end wall 116 has a first height $H_1$ that varies based on the arcuate top edge 126, and the second end wall 118 has a second height $H_2$ that varies based on the arcuate top edge 128. In this embodiment, height $H_2$ is greater than height $H_1$ at all corresponding points on the second end wall 118 and the first end wall 116. In this embodiment, the difference in height $H_2$ and height $H_1$ defines a slope of the top wall 120, such that the top wall 120 is sloped downwardly from the second end wall 118 towards the first end wall 116. The slope biases the container 104 towards the projection 130 and facilitates ensuring the container 104 is not dislodged from the top wall 120, for example, during operation. The slope of the top wall 120 is dependent upon the particular difference between height $H_2$ and height $H_1$. In some embodiments, for example, the slope is about 3° from horizontal, about 5° from horizontal, about 7° from horizontal, about 10° from horizontal, or about 20° from horizontal. In other embodiments, the top wall 120 may have any other suitable slope that enables the mixing apparatus 100 to function as described herein, including slopes within a range between any of the aforementioned slopes, slopes less than 3°, and slopes greater than 20°. In other embodiments, the first end wall 116 and the second end wall 118 have the same (variable) height, such that the top wall 120 has no slope.

The projection 130 includes two pockets 136, 138 defined therein (see FIG. 5), to accommodate the pair of rollers 108, 110, as described further herein. The pockets 136, 138 extend from the end face 134 of the projection 130, inwardly (e.g., towards the cavity 124) and towards the first end wall 116 of the housing 106. At least one of the pockets 136 is at least partially open to the cavity 124, as described further herein. In some embodiments, this pocket 136 represents the only opening into the cavity 124. That is, the cavity 124 is otherwise completely enclosed but for the opening in the pocket 136.

The top wall 120 further includes two channels 140, 142 sized and shaped to accommodate the pair of rollers 108, 110, respectively, therein. Specifically, the channels 140, 142, extend parallel to one another and generally parallel to the lengthwise direction of the mixing apparatus 100. The channels 140, 142 have a generally semi-cylindrical profile, and extend from the second end wall 118 towards the first end wall 116. In the example embodiment, a first end (not labeled) of the channels 140, 142 terminates adjacent to the first end wall 116. More specifically, the first ends of the channels 140, 142 terminate within the projection 130, at the pockets 136, 138. That is, the first ends of the channels 140, 142 extend to the pockets 136, 138 and are coterminous with the pockets 136, 138 adjacent to the first end wall 116. The second end 144, 146 of each channel 140, 142 is adjacent to the second end wall 118, as shown in FIG. 3.

In the example embodiment, each roller of the pair of rollers 108, 110 is positioned within a corresponding one of the channels 140, 142 such that the pair of rollers 108, 110 extends from the first end wall 116 to the second end wall 118. Each roller 108, 110 includes a first end 148 and a second end 150. The first end 148 of each roller 108, 110 is positioned within a respective one of the pockets 136, 138 defined in the projection 130, such that the pockets 136, 138 enclose the first ends 148 of the rollers 108, 110. The second end 150 of each roller 108, 110 is positioned adjacent to the second end wall 118. The rollers 108, 110 are spaced apart by a spacing S, which is generally defined by a spacing between the channels 140, 142. The spacing S may be selected based upon an average or typical container size (e.g., diameter), such that both rollers 108, 110 simultaneously contact or support a circumferential surface of the container 104 when the container 104 is placed on the mixing apparatus 100. Each roller 108, 110 is rotatable relative to the housing 106, within the channels 140, 142, about a respective axis of rotation 162, 163. Rollers 108, 110 are oriented parallel to one another, such that axes 162, 163 likewise are oriented parallel to one another. In addition, when the pair of rollers 108, 110 are positioned in the channels 140, 142, each roller 108, 110 is positioned at a same vertical distance from the bottom wall 122 of the housing 106.

When the rollers 108, 110 are positioned within the channels 140, 142, the rollers 108, 110 may be understood to extend through the top wall 120. More particularly, the rollers 108, 110 extend through a continuous, arcuate plane (not specifically shown) generally defined by the top wall 120. A portion 152 of the rollers 108, 110 extends above this plane defined by the top wall 120, and a portion 154 of the rollers 108, 110 extends below this plane defined by the top wall 120. The portion 152 of each roller 108, 110 that protrudes above the top wall 120—that is, the portion 152 of each roller 108, 110 that is not enclosed within the respective channel 140, 142—defines an effective height $H_{roll}$ of the roller 108, 110 (see FIG. 5). The effective height $H_{roll}$ of each roller 108, 110 is measured between a top of the respective roller 108, 110 and a lowest point of the top wall 120 of the housing 106 and is measured along a direction perpendicular to a tangent line at the top of the roller 108, 110. The effective height $H_{roll}$ of each roller 108, 110 is associated with a depth (not shown) of each channel 140, 142. More specifically, the deeper each channel 140, 142, the lower the effective height $H_{roll}$ of each roller 108, 110. In the example embodiment, each channel 140, 142 has a depth such that a majority of each roller 108, 110 is enclosed therein. Accordingly, the effective height $H_{roll}$ of each roller 108, 110 is less than half of a diameter d (see FIGS. 5 and 6) of each roller 108, 110. In an alternative embodiment, each channel 140, 142 has a depth such that less than a majority of each roller 108, 110 is enclosed therein. In such embodiments, the effective height $H_{roll}$ of each roller 108, 110 is greater than half of the diameter d of each roller 108, 110. In the example embodiment, the diameter d of the rollers 108, 110 is between about 1.5 cm and about 3 cm, and may be about 2 cm.

In the illustrated embodiment, the rollers 108, 110 each have a smooth outer surface 109, 111. As such, the container 104 is rotated smoothly by the rollers 108, 110. In another embodiment, one or both of the rollers 108, 110 has a ridged or ribbed outer surface 109, 111, with longitudinally-extending ridges or ribs (e.g., extending parallel to axes 162, 163). In such an embodiment, the ridges or ribs generate a vibratory effect when the rollers 108, 110 rotate the container 104. These vibrations may enhance the mixing of the food product 102 within the container 104.

The rollers 108, 110 may be formed from any suitable material and/or combination of materials, including materials having a coefficient of friction that ensures rotation of the container 104 when at least one of the rollers 108, 110 is driven to rotate. The rollers 108, 110 may include, for example, plastic, metal, rubber, foam, and/or any other material. The rollers 108, 110 may be the same (e.g., formed from the same material(s)) or different (e.g., formed from different material(s)).

Turning to FIGS. 5 and 6, the housing 106 encloses a plurality of internal components, including a motor 156 and a power source 158, each of which is positioned within the cavity 124 and, therefore, is enclosed within the housing 106. As described further herein, the power source 158 is operatively coupled to the motor 156 to provide power to the motor 156, which drives one roller 108 of the pair of rollers 108, 110 to rotate the container 104 and mix the food product 102 within the container 104. By enclosing the motor 156 and the power source 158 within the housing 106, the overall size of the mixing apparatus 100 is minimized. Moreover, by enclosing the power source 158 within the housing 106, the mixing apparatus 100 does not require an external power source (e.g., an AC power outlet), is portable, and can operate within an enclosed or confined space (e.g., a refrigerator).

In the example embodiment, the power source 158 includes a DC power source in the form of a battery 160. It should be readily understood that the battery 160 may include one battery, more than one battery, a battery pack, and the like, without departing from the scope of the present disclosure. The battery 160 may be of any size, capacity, and/or number that is suitable to operate the motor 156 as described herein. For example, in some embodiments, the battery 160 includes 4 AA (1.5 V) batteries. In the example embodiment, the battery 160 has a suitable capacity for up to about 50 uses of the mixing apparatus 100, depending on how long the mixing apparatus 100 is activated, as described further below. In some embodiments, the housing 106 includes a removable battery cover (not shown), which may be removed to expose a battery enclosure (not shown). A user may insert the battery 160 into and/or remove the battery 160 from the battery enclosure and may replace the removable battery cover. The battery cover may be defined, for example, in the bottom wall 122, the first or second side wall 112, 114, or the first or second end wall 116, 118. In other embodiments, the battery 160 may be rechargeable, and the housing 106 may therefore not include a removable battery cover. The housing 106 may include a charging port (e.g., to enable wired charging of the one or more batteries) and/or an inductive coil therein (e.g., to enable wireless charging of the one or more batteries) (neither shown). The power source 158 may include additional and/or alternative direct current (DC) power source components other than the battery 160.

The motor 156, which is powered by the power source 158, is operatively coupled to one roller 108 of the pair of rollers 108, 110, further referred to herein as an "active roller." The other roller 110 of the pair of rollers 108, 110 is further referred to herein as a "passive roller." The motor 156 is configured to drive the active roller 108 to rotate about an axis of rotation 162. Such rotation of the active roller 108 causes the container 104 to rotate. Rotation of the container 104 causes the food product 102 therein to be mixed, and also causes corresponding and opposite rotation of the passive roller 110, which supports the container 104. In some embodiments, the mixing apparatus 100 may not include the passive roller 110 (and, accordingly, may only include one channel 140 defined in the top wall 120). For example, the arcuate profile of the top wall 120 may enable the container 104 to rotate and maintain contact with the active roller 108.

In the example embodiment, the motor 156 is operatively coupled to the active roller 108 by a belt 164. As the motor 156 is powered by the power source 158, the motor 156 drives a drive shaft 166 to rotate. In the example embodiment, a pulley or cog 168 is coupled to an end of the drive shaft 166, and the belt 164 is coupled about the pulley 168. The belt extends through the housing 106 (e.g., within the pocket 136 and/or the channel 140) and is coupled to the first end 148 of the active roller 108 via a pulley or cog 169 coupled to the first end 148 of the active roller 108. Accordingly, the rotating motion of the drive shaft 166 is transferred to the active roller 108 through the belt 164, and the active roller 108 is rotated about the axis 162. In the example embodiment, the belt 164 is a toothed or notched belt configured to mesh with cogs 168 and 169 coupled at the end of drive shaft 166 and the first end 148 of the active roller 108, respectively. In other embodiments, the mixing apparatus 100 may include any suitable belt drive that enables the mixing apparatus 100 to function as described herein, including, for example and without limitation, a flat belt drive. Further, in yet other embodiments, the mixing apparatus 100 may include a power transmission system other than a belt drive to transmit power from the motor 156 to the active roller, including, for example and without limitation, a geared power transmission system. In the example embodiment, the motor 156 includes a 5-7 V motor and is configured to operate at between about 300 rotations per minute (RPM) and about 400 RPM, such as about 350 RPM. Based on the operative connection of the motor 156 to the active roller 108 via the belt 164, this rotational speed of the motor 156 causes the active roller 108 to rotate the container 104 at between 50 and 100 RPM, or about 70 RPM.

The mixing apparatus 100 also includes an activation component 170 that enables a user to activate or turn on the mixing apparatus 100. In the example embodiment, the activation component 170 includes a button that, when depressed, causes the power source 158 to provide power to the motor 156. In some embodiments, the activation component 170 is also a deactivation component. For example, a user may depress the button while the mixing apparatus 100 is on to deactivate or shut off the mixing apparatus 100 (e.g., cause the power source 158 to stop providing power to the motor 156). The activation component and deactivation component may be separate components, and the activation component and/or the deactivation component may additionally or alternatively include one or more switches, buttons, knobs, and/or other controls. In some embodiments, the activation component 170 may include a sensor, such as a weight sensor or a presence sensor. In such embodiments, the user may not need to actively activate the mixing apparatus 100. For example, the sensor may detect that the container 104 has been placed on the mixing apparatus 100 and may automatically activate or turn on the mixing apparatus 100 to begin rotating the container 104.

In the example embodiment, the mixing apparatus 100 also includes a timer 172 positioned within the cavity 124 and enclosed within the housing 106. The timer 172 is configured to monitor how long the power source 158 provides power to the motor 156, and to terminate the supply of power to the motor 156 after a predetermined amount of time. The timer 172 may generally comprise any suitable timer that enables the mixing apparatus 100 to function as described herein, including, for example and without limitation, analog timing circuits, digital timing circuits, and combinations thereof. In some embodiments, the timer 172 is pre-set or pre-configured to include the predetermined amount of time. Alternatively, the housing 106 includes a timer input component 174 that enables a user of the mixing apparatus 100 to set the timer 172. In the example embodiment, the timer input component 174 includes a slider component. The timer input component 174 may enable the user to select from a plurality of predetermined amounts of time (e.g., 15 minutes, 30 minutes, or 1 hour), or the timer input component 174 may be continuously variable within a suitable range (e.g., between 1 minute and 120 minutes) such that a user can select virtually any predetermined amount of time within the range. The timer input component 174 may additionally or alternatively include one or more buttons, knobs, switches, and/or other controls that enable a user to set a time limit on the supply of power to the motor 156.

The timer 172 terminates power to the motor 156 after the predetermined amount of time has elapsed. The power source 158 may therefore be conserved without additional interaction from the user. For example, the user may activate the mixing apparatus 100 (e.g., using the activation component 170) and then provide no additional input, and the mixing apparatus 100 will operate (i.e., mix the food product 102 within the container 104) for the predetermined amount of time and then shut off. Optionally, as described elsewhere herein, the user may place the activated mixing apparatus 100 within a cool, enclosed space such as a refrigerator, to facilitate the homogenized food product remaining in the mixed state.

In some embodiments, the mixing apparatus 100 includes a vibrator 176 housed or enclosed within the housing 106. The vibrator 176 is configured to generate vibrations that are transmitted to one or both of the rollers 108, 110 to thereby vibrate the container 104 to facilitate mixing of the food product 102. The vibrator 176 can generally comprise any suitable vibratory components that enable the vibrator 176 to function as described herein including, for example and without limitation, electric motor vibrators and piezoelectric transducers. In some embodiments, the vibrator 176 includes an unbalanced (e.g., eccentric) mass coupled to the drive shaft 166 of the motor 156, such that the motor 156 also drives the vibrator 176 to operate when the mixing apparatus 100 is activated. Alternatively, the vibrator 176 has a separate vibration motor operatively coupled to the power source 158, and the power source 158 provides power directly to the vibrator 176. The vibrator 176 may be configured to generate vibrations through the housing 106 and/or through the active roller 108. The vibrations may enhance mixing of the food product 102 within the container 104.

In operation, the container 104 is placed on the mixing apparatus 100. In the example embodiment, the container 104 is generally cylindrical, such that the container 104 may be rotated by the active roller 108. The container 104 may be alternatively shaped, such as spherical, ellipsoidal, and the like. The container 104 stores a food product 102 therein. The food product 102 is non-homogenized and will be homogenized by the rotation of the container 104. In the example embodiment, the food product 102 is an oil-based food product, such as a food product that is prone to separate when left at room temperature and/or when left immobile. For example, the food product 102 separates into solid components and liquid (oil) components when left at room temperature (e.g., almond butter, peanut butter, etc.) or separates insoluble liquid components (e.g., oil from water-based components) when left motionless (e.g., oil-based salad dressings). However, the mixing apparatus 100 may be used to mix any food product, including solid, multi-component food products (e.g., nut mixes), non-oil-based foods that experience separation (e.g., yogurt, juices or liquids with solids suspended therein such as pulp or seeds). Accordingly, the mixing apparatus 100 is not limited by the food product(s) 102 contained within the container 104.

Figure 7:
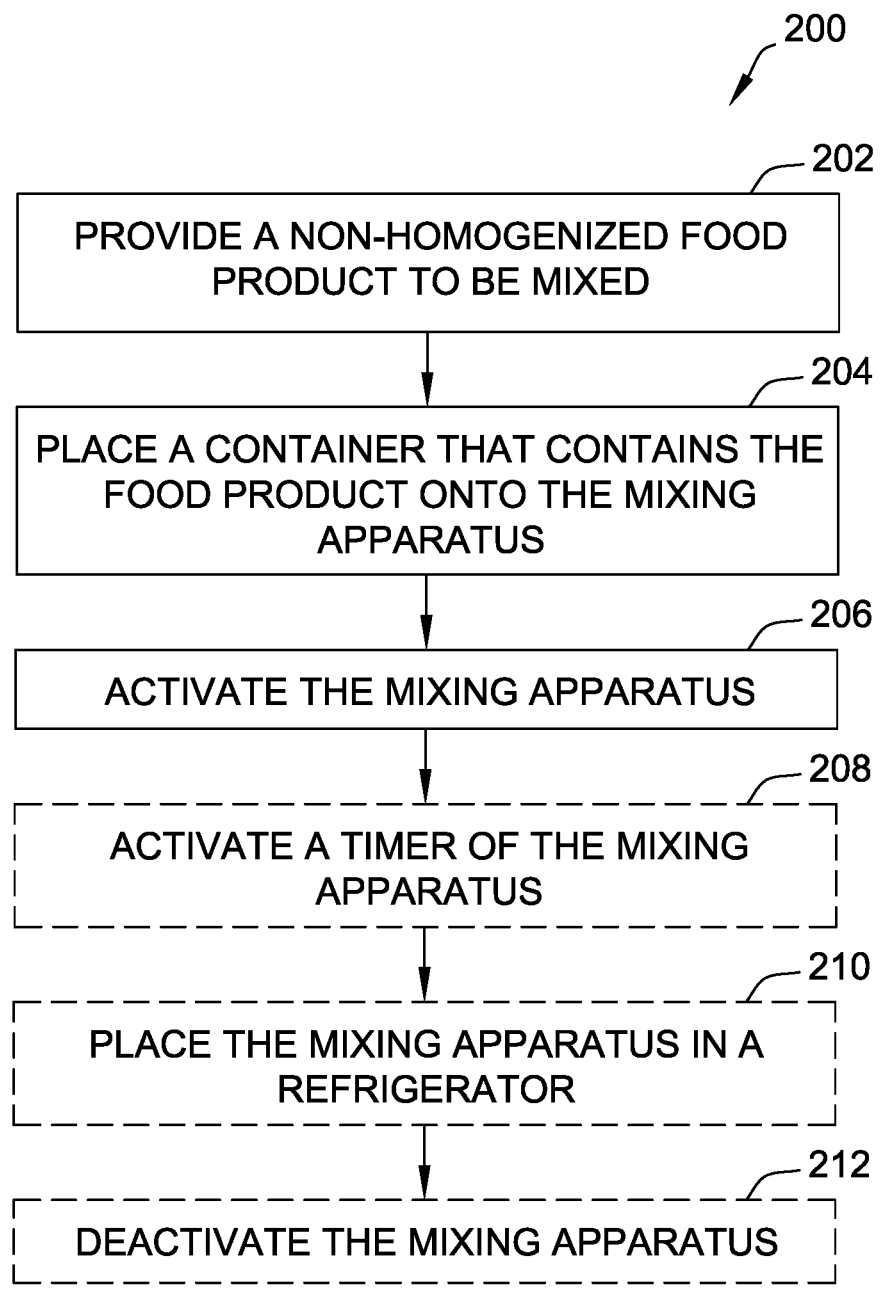
FIG. 7 is a flow diagram of an example method of operating the mixing apparatus shown in FIGS. 1-6.

Accordingly, the mixing apparatus 100 is suitable for mixing food product 102 within the container 104 placed thereon. The mixing apparatus 100 as described herein enables a user to "set it and forget it," and have a homogenized, mixed food product 102 without additional interaction with the mixing apparatus 100. For example, the user may implement a method 200 as shown in FIG. 7 for mixing a non-homogenized food product 102. Optional steps of the method 200 are illustrated using dotted lines.

The method 200 begins with the user providing 202 a non-homogenized food product that the user desires to have mixed by the mixing apparatus 100. The user places 204 a container (e.g., the container 104, shown in FIG. 2) that contains the food product onto the mixing apparatus 100. Placing 204 the container includes positioning the container such that the container contacts the active roller 108. Subsequently, the user activates 206 the mixing apparatus 100 as described herein. Activating 206 the mixing apparatus 100 causes the power source 158 to provide power to the motor 156 and the motor 156 to drive the active roller 108 to rotate, which causes rotation of the container and mixing of the food product therein. Optionally, the user may activate or set 208 a timer 172 of the mixing apparatus 100, which will deactivate 212 the mixing apparatus 100 after a predetermined amount of time has elapsed.

In some cases, the food product will become non-homogenized over time if the food product is left at room temperature and/or is motionless. Optionally, the user may place 210 the mixing apparatus 100 with the container placed thereon in a refrigerator and allow the mixing apparatus 100 to rotate the container while the mixing apparatus 100 is within the refrigerator, such that, upon deactivation 212 of the mixing apparatus 100 (whether through manual deactivation by the user or expiration of the timer 172, as described herein), the food product will remain cool and will therefore not re-separate. Because the mixing apparatus 100 fully contains the power source—that is, the mixing apparatus 100 is wireless—the mixing apparatus 100 may be placed 210 in the refrigerator or other enclosed location (e.g., a cool pantry) and operate as described herein without external power.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to illustrate the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mixing apparatus for mixing a non-homogenized food product contained within a container, the mixing apparatus comprising:
   a housing comprising a first end wall, a second end wall, and a top wall extending between the first end wall and the second end wall, wherein the first end wall, the second end wall, and the top wall at least partially define a cavity of the housing, wherein the top wall slopes downwardly from the second end wall towards the first end wall, the top wall partially defining an upwardly extending projection proximate to the first end wall and a non-projecting arcuate edge proximate to the second end wall;
   a pair of rollers coupled to the housing such that each roller of the pair of rollers is rotatable relative to the housing about a respective axis, wherein the respective axes of the pair of rollers are oriented parallel to one another, and wherein each roller of the pair of rollers extends from adjacent to the second end wall towards the first end wall, and at least one roller of the pair of rollers extends into the projection;
   a motor positioned in the cavity and enclosed within the housing, the motor operatively coupled to a first roller of the pair of rollers and configured to drive the first roller to rotate for rotating the container, wherein the motor is operatively coupleable to a power source to drive the first roller of the pair of rollers.

2. The mixing apparatus of claim 1, wherein a top surface of the top wall is arcuate to accommodate the container having a generally cylindrical shape.

3. The mixing apparatus of claim 1, wherein the second end wall adjoins the top wall along the arcuate edge of the top wall.

4. The mixing apparatus of claim 1, wherein the top wall includes a pair of channels defined therein, and wherein each roller of the pair of rollers is positioned in a corresponding channel of the pair of channels.

5. The mixing apparatus of claim 4, wherein a portion of each roller of the pair of rollers is enclosed within the corresponding channel of the pair of channels, and a remainder of each roller of the pair of rollers that protrudes outward of the corresponding channel of the pair of channels defines an effective height of each roller above the top wall.

6. The mixing apparatus of claim 1, further comprising a timer configured to terminate power from the power source to the motor after a predetermined amount of time has elapsed.

7. The mixing apparatus of claim 1, wherein the motor is operatively coupled to the first roller by a belt, wherein the belt extends from the motor to the first roller through the housing.

8. The mixing apparatus of claim 1, wherein the housing further comprises:
   first and second side walls adjoining the top wall and extending between the first end wall and the second end wall; and
   a bottom wall extending between the first and second end walls, wherein the first side wall, the second side wall, and the bottom wall further define the cavity.

9. The mixing apparatus of claim 1, wherein each roller of the pair of rollers is positioned at a same vertical distance from a bottom wall of the housing.

10. The mixing apparatus of claim 1, wherein the first end wall has a height $H_1$ and the second end wall has a height $H_2$, the difference in height defining the slope of the top wall.

11. The mixing apparatus of claim 1 further comprising a vibrator enclosed within the housing and configured to vibrate at least one roller of the pair of rollers.

12. The mixing apparatus of claim 1, wherein at least one roller of the pair of rollers comprises a plurality of ribs extending longitudinally along the at least one roller, the plurality of ribs configured to generate a vibratory effect on the container when the container is rotated thereon.

13. A system comprising:
    a mixing apparatus for mixing a non-homogenized food product, the mixing apparatus comprising:
    a housing comprising a first end wall, a second end wall, and a top wall extending between the first end wall and the second end wall, wherein the first end wall, the second end wall, and the top wall at least partially define a cavity of the housing, wherein the top wall slopes downwardly from the second end wall towards the first end wall, the top wall partially defining an upwardly extending projection proximate to the first end wall and a non-projecting arcuate edge proximate to the second end wall;
    a pair of rollers coupled to the housing such that each roller of the pair of rollers is rotatable relative to the housing about a respective axis, wherein the respective axes of the pair of rollers are oriented parallel to one another, and wherein each roller of the pair of rollers extends from adjacent to the second end wall towards the first end wall, and at least one roller of the pair of rollers extends into the projection;
    a motor positioned in the cavity and enclosed within the housing, the motor operatively coupled to a first roller of the pair of rollers and configured to drive the first roller to rotate, wherein the motor is operatively coupleable to a power source to drive the first roller of the pair of rollers; and
    a container including the non-homogenized food product positioned on the pair of rollers such that, when the first roller is driven by the motor to rotate, the container is rotated by the first roller to mix the non-homogenized food product.

14. The system of claim 13, wherein a top surface of the top wall is arcuate to accommodate the container having a generally cylindrical shape.

15. The system of claim 13, wherein the second end wall adjoins the top wall along the arcuate edge of the top wall.

16. The system of claim 13, wherein the top wall includes a pair of channels defined therein, and wherein each roller of the pair of rollers is positioned in a corresponding channel of the pair of channels.

17. The system of claim 16, wherein a portion of each roller of the pair of rollers is enclosed within the corresponding channel of the pair of channels, and a remainder of each roller of the pair of rollers that protrudes outward of the corresponding channel of the pair of channels defines an effective height of each roller above the top wall.

18. The system of claim 13, wherein the mixing apparatus further comprises a timer configured to terminate power from the power source to the motor after a predetermined amount of time has elapsed.

19. A method of mixing a non-homogenized food product, the method comprising:
providing a container including the non-homogenized food product;
placing the container onto a mixing apparatus including (i) a housing defining a cavity enclosed therein, wherein the housing includes a first end wall, a second end wall, and a top wall extending between the first end wall and the second end wall, wherein the top wall slopes downwardly from the second end wall towards the first end wall, the top wall partially defining an upwardly extending projection proximate to the first end wall and a non-projecting arcuate edge proximate to the second end wall, (ii) a pair of rollers coupled to the housing such that each roller of the pair of rollers is rotatable relative to the housing about a respective axis, wherein the respective axes of the pair of rollers are oriented parallel to one another, and wherein each roller of the pair of rollers extends from adjacent to the second end wall towards the first end wall, and at least one roller of the pair of rollers extends into the projection, and (iii) a motor positioned in the cavity and operatively coupled to a first roller of the pair of rollers, the motor configured to drive the first roller to rotate, wherein the motor is operatively coupleable to a power source to drive the first roller of the pair of rollers; and
activating the mixing apparatus such that the first roller is driven by the motor to rotate and cause the container to rotate to mix the non-homogenized food product.

* * * * *